US008624563B2

(12) United States Patent
Ginet et al.

(10) Patent No.: US 8,624,563 B2
(45) Date of Patent: Jan. 7, 2014

(54) STATIC EXCITER OF A FIELD WINDING AND METHOD FOR OPERATING THE SAME

(75) Inventors: Constantin Ginet, Cusco (PE); Luis Diez-Maroto, Madrid (ES)

(73) Assignee: Alstom Technology Ltd., Baden (CH)

( * ) Notice: Subject to any disclaimer, the term of this patent is extended or adjusted under 35 U.S.C. 154(b) by 656 days.

(21) Appl. No.: 12/847,298

(22) Filed: Jul. 30, 2010

(65) Prior Publication Data

US 2011/0050183 A1    Mar. 3, 2011

(30) Foreign Application Priority Data

Jul. 30, 2009   (EP) ..................................... 09166899

(51) Int. Cl.
  *H02P 9/00*  (2006.01)
  *H02P 9/10*  (2006.01)
  *H02P 11/00* (2006.01)

(52) U.S. Cl.
  USPC ................................. 322/44; 322/59; 322/28

(58) Field of Classification Search
  USPC ......................................... 322/44, 20, 89, 59
  See application file for complete search history.

(56) References Cited

U.S. PATENT DOCUMENTS 4,426,613 A *   1/1984  Mizuno et al. ................... 322/21
2007/0296275 A1* 12/2007  Joho ................................ 307/47

FOREIGN PATENT DOCUMENTS

EP   0 122 310 A1   10/1984
JP   58-159699 A    9/1983

OTHER PUBLICATIONS

European Search Report of EP 09 16 6899 mailed Sep. 21, 2009, 6 pages.

* cited by examiner

*Primary Examiner* — Julio Cesar Gonzalez
(74) *Attorney, Agent, or Firm* — Buchanan Ingersoll & Rooney PC

(57) ABSTRACT

A static exciter of a field winding includes a rectifier connected to an electric grid and to the field winding; a unidirectional electronic switch connected in series with the rectifier; a capacitor bank; and a further switch disposed between the unidirectional electronic switch and the capacitor bank. Exciter also includes a control unit connected to the further switch and configured to close the further switch when a grid voltage drops below a first prefixed voltage value so as to connect the capacitor bank to the field winding and configured to open the further switch when the grid voltage exceeds a second prefixed voltage value so as to disconnect the capacitor bank from the field winding and so as to supply energy to the field winding from the capacitor bank for a time period.

11 Claims, 3 Drawing Sheets

STATIC EXCITER OF A FIELD WINDING AND METHOD FOR OPERATING THE SAME

CROSS REFERENCE TO PRIOR APPLICATIONS

Priority is claimed to European Convention Application No. EP 09166899.6, filed Jul. 30, 2009, the entire disclosure of which is incorporated by reference herein.

FIELD

The present invention relates to a static exciter of a field winding and a method for operating the same.

BACKGROUND OF THE INVENTION

Static exciters are widely used for feeding the field winding of electric generators.

US2007/0296275 discloses (with reference to FIG. 1 of this document) a static exciter 1 having an exciter transformer 2 that is connected at one side to a busbar 3 of a generator 4 (i.e. to the output of the generator) and at the other side to a rectifier 5 that converts the AC voltage fed from the exciter transformer 2 into a DC voltage.

The rectifier 5 is typically driven by an AVR (Automatic Voltage Regulator) 6 that is connected to the busbar 3 via a voltage transformer 7.

The DC side of the rectifier 5 is connected in series with the field winding 8 of the generator 4 and a forward biased diode 9.

The forward biased diode 9 is connected in parallel with a capacitor bank 10; moreover a switch 11 is provided between the capacitor bank 10 and the diode 9; such switch 11 can be closed to connect the capacitor bank 10 in series with the rectifier 5.

During normal operation the switch 11 is open; the AC voltage from the exciter transformer 2 is converted into a DC voltage and is fed to the field winding 8 because the diode 9 is forward biased and conducts.

In case a disturbance at the grid occurs (for example due to a short circuits in the transmission line) the voltage of the grid drops and, therefore, also the voltage of the busbar 3 and the voltage at the lower voltage side of the voltage transformer 7 drops.

When the voltage at the lower voltage side of the voltage transformer 7 drops below a prefixed voltage value, the switch 11 is closed such that the diode 9 is reverse biased (and does not conduct anymore) and the capacitor bank 10 is connected in series with the rectifier 5 and field winding 8.

This causes a considerably higher field voltage to be applied to the field winding 8 and guarantees the stability of the generator/grid system.

Nevertheless, once a disturbance occurs, the capacitor bank 10 is fully discharged, therefore if a plurality of disturbances occurs the system is not able to cope with them.

In fact (FIG. 1), even if the static exciter 1 is provided with a charging device 12 (such as a battery) that keeps the capacitor bank 10 charged, the charging device dimension is usually small and it takes minutes to hours for it to recharge the capacitor bank 10 to an acceptable charge level.

SUMMARY OF THE INVENTION

An aspect of the present invention is therefore to provide a static exciter and a method by which the said problems of the known art are eliminated.

In an embodiment, a static exciter and a method are provided that are able to cope with a plurality of disturbances that occur in a short period time one after the other (for example few minutes).

The technical aim, together with this and further aspects, are attained according to the invention by providing a static exciter and a method in accordance with the accompanying claims.

BRIEF DESCRIPTION OF THE DRAWINGS

Further characteristics and advantages of the invention will be more apparent from the description of a preferred but non-exclusive embodiment of the static exciter and method according to the invention, illustrated by way of non-limiting example in the accompanying drawings, in which.

DETAILED DESCRIPTION

Figure 1:
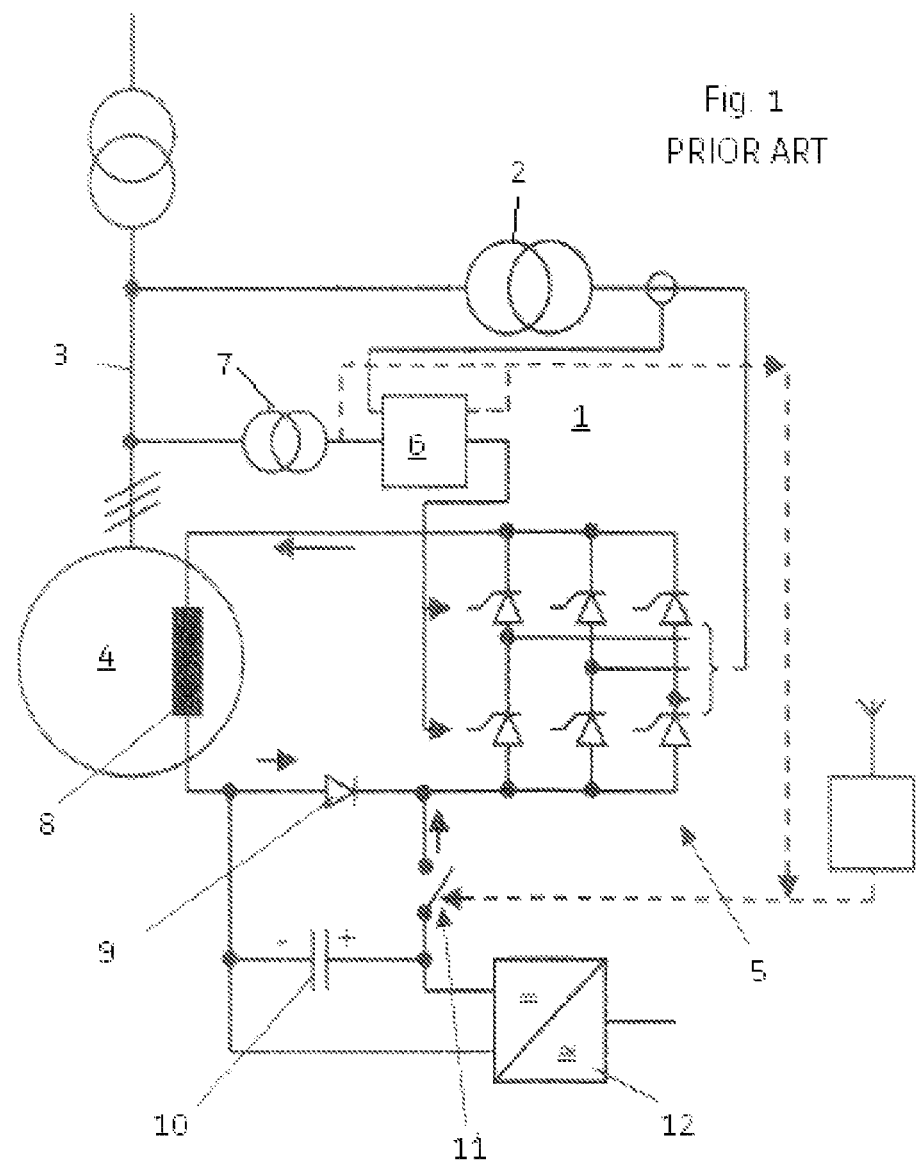
FIG. 1 is a schematic view of a static exciter according to the prior art.

With reference to the figures, these show a static exciter 1 of the field winding 8 of an electric generator 4.

The electric generator 4 has a busbar 3 connected to an electric grid 20 via a transformer 21.

The static exciter 1 comprises the rectifier 5 made of a thyristor bridge, connected to the busbar 3 via the exciter transformer 2 from one side (alternatively the voltage transformer 7 may also be connected to the grid 20), and to the field winding 8 of the electric generator 1 from the other side.

The static exciter 1 also has a unidirectional electronic switch such as the forward biased diode 9 connected in series with the rectifier 5.

In addition, the static exciter 1 also has a capacitor bank 10, for example made of a plurality of super capacitors connected in series and parallel with each other; the capacitor bank 10 is connected in parallel with the diode 9.

The static exciter 1 further comprises the switch 11 between the diode 9 and the capacitor bank 10; the switch 11 is connected to a control unit 22 that closes it when a voltage indicative of the grid voltage (that is controlled through the voltage of the busbar 3, that is connected to the grid 20 via the transformer 21) drops below a first prefixed voltage value $V_1$, to connect the capacitor bank 10 to the field winding 8.

Advantageously, the control unit 22 opens the switch 11 when a voltage indicative of the grid voltage (that is controlled through the voltage of the busbar 3) exceeds a second prefixed voltage value $V_2$, to disconnect the capacitor bank 10 from the field winding 8.

This lets the capacitor bank 10 supply energy to the field winding 8 only for the time needed and prevents the full discharge of the capacitor bank 10, avoiding feeding of energy when it is not needed.

The second prefixed voltage value $V_2$ is greater than or equal to the first prefixed voltage value $V_1$; preferably, in order to avoid oscillating-like closings and reopenings of the switch 11, the second prefixed voltage value $V_2$ is greater than the first prefixed voltage value $V_1$.

The stator exciter 1 also comprises the voltage transformer 7 that supplies the AVR 6 (Automatic Voltage Regulator) of the field winding 8; preferably the grid voltage drop is measured at the lower voltage side of the voltage transformer 7.

The control unit 22 has a third prefixed voltage value $V_3$, such that when the voltage of the capacitor bank 10 drops below the third prefixed voltage value $V_3$ the control unit 22 opens the switch 11 (so preventing the full discharge of the capacitor bank 10).

Figure 2:
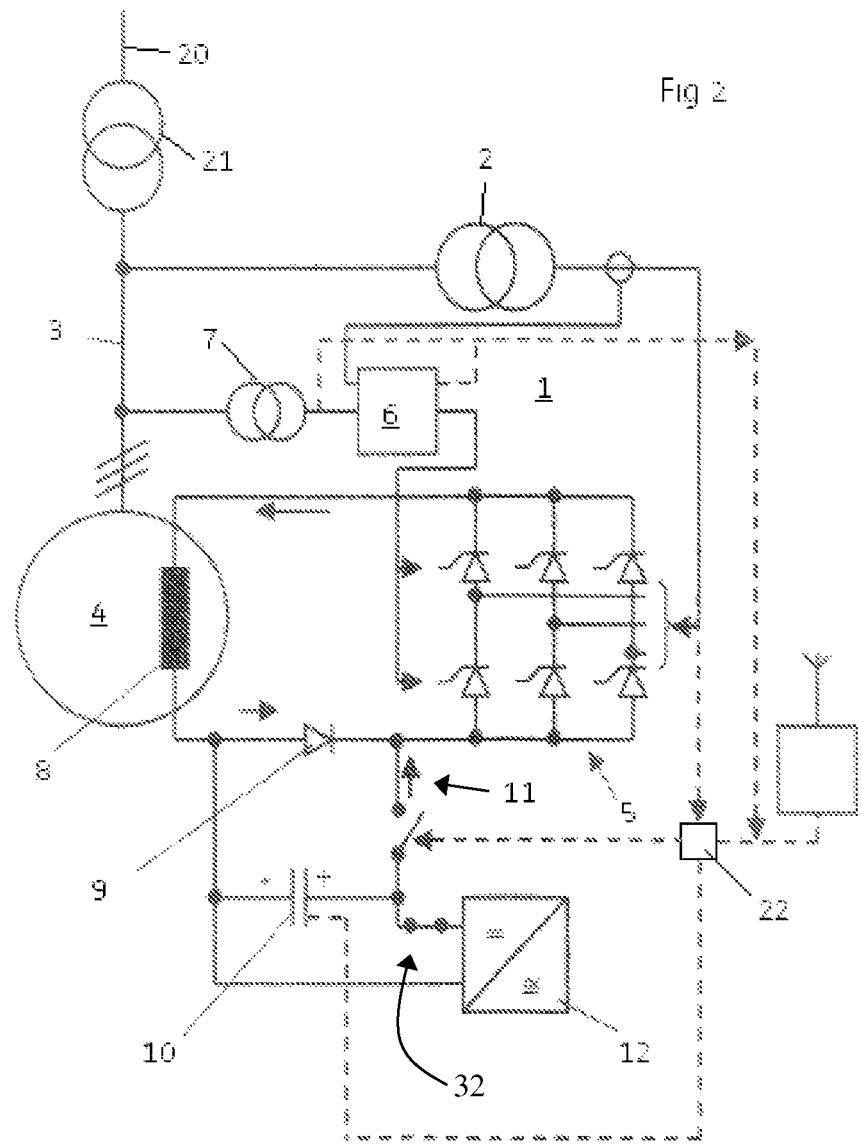
FIG. 2 is a schematic view of a static exciter according an embodiment of the invention.

In addition, the charging device 12 is also provided with a charging switch 32 protecting the charging device 12, which works mainly as a constant voltage source, from overcurrent. In particular when the switch 11 is closed the charging switch 32 is open, and when the switch 11 is open the charging switch 32 is closed. FIG. 2 shows the switch 11 open and the charging switch 32 closed. Alternatively the charging device produces a constant current, with an overruling voltage limitation (thus eliminating the need of a charging switch).

The operation of the stator exciter in this embodiment of the invention is apparent from that described and illustrated and is substantially the following.

When a disturbance at the grid 20 occurs and its voltage drops, also the voltage of the busbar 3 drops.

The control unit 22 continuously monitors the voltage of the busbar 3 (i.e. the voltage of the grid 20) and when it detects such a drop, drives the switch 11 to close it.

Thus the capacitor bank 10 is connected in series with the rectifier 5 and feeds its energy to the field winding 8 of the generator 1.

When the voltage of the grid 20 (and thus the voltage of the busbar 3) rises again (usually it take a very short time due to the automatic protection devices of the grid), the control unit 22 detects the increased voltage of the busbar 3.

When the voltage of the grid 20 (and thus the voltage of the busbar 3) exceeds the second prefixed voltage value $V_2$, the control unit 22 drives the switch 11 to open it.

Usually reopening of the switch 11 is so fast that the capacitor bank 10 is not fully discharged, such that if further disturbances at the grid 20 occur, the capacitor bank 10 is able to cope with them.

Moreover, in order to prevent the capacitor bank 10 from being fully discharged, when the control unit 22 detects a voltage of the capacitor bank 10 lower than the third prefixed voltage value $V_3$, it opens the switch 11. In fact, in this case the most severe phase of operation is already overcome, and the capacitor bank charge is saved for further disturbances in the grid 20.

In a different embodiment of the invention, the control unit 22 closes or opens the switch 11 with a prefixed delay.

Figure 3:
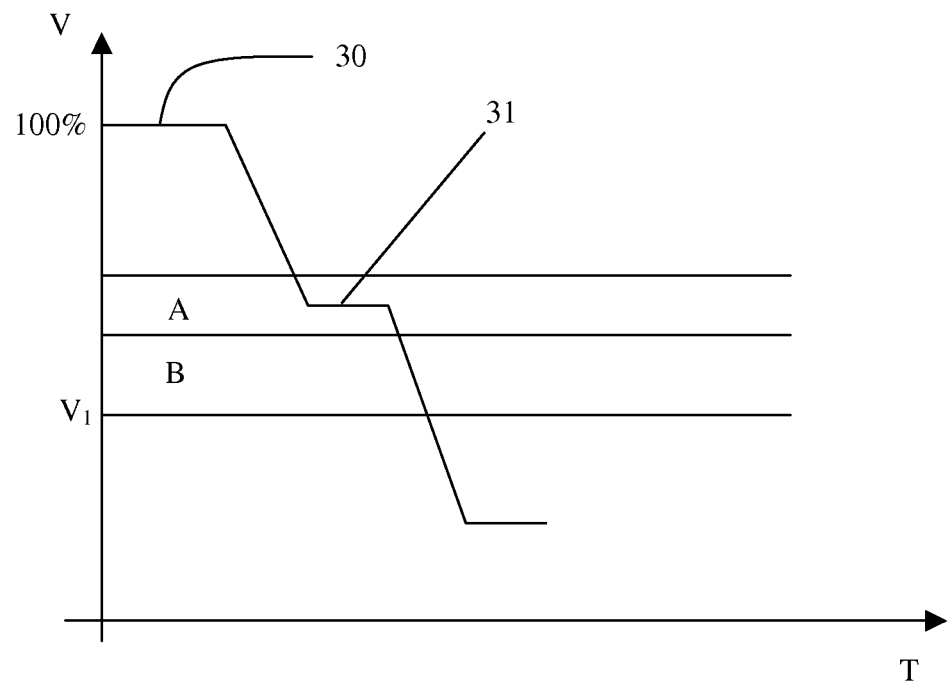
FIGS. 3 and 4 are diagrams showing switch closing/opening delay time bands according to an embodiment of the invention.
Figure 4:
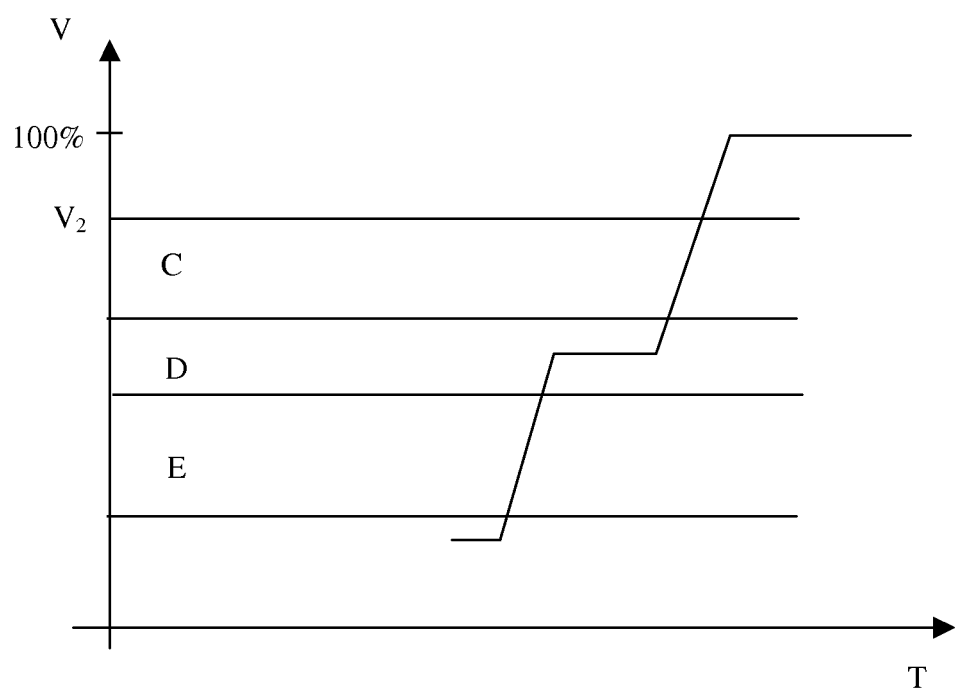

In fact, often when a disturbance at the grid 20 occurs, the voltage drops and rises in two or more steps; for example FIG. 3 shows the voltage that drops in two steps and FIG. 4 shows the voltage that rises again in two steps.

The delay time lets the capacitor bank discharge be optimised in relation to the electric power actually needed.

In particular (FIG. 3), the control unit 10 has stored a voltage drop band series (to be used when the voltage of the grid drops) and a prefixed closing delay time for the switch 11 associated to each voltage band of the voltage drop band series.

Correspondingly (FIG. 4), the control unit 10 has stored a voltage rise band series (to be used when the voltage of the grid rises) and a prefixed opening delay time for the switch 11 associated to each voltage band.

FIG. 3 shows the voltage bands A, B of the voltage drop band series that have voltages greater than the $V_1$ voltage and each voltage band A, B has associated a delay time $T_A$, $T_B$. These delay times progressively decrease with decreasing voltage; the delay time for a voltage lower that the $V_1$ voltage is zero.

Correspondingly, FIG. 4 shows the voltage bands C, D, E of the voltage rise band series that have voltages lower than the $V_2$ voltage and each voltage band C, D, E has associated a delay time $T_C$, $T_D$, $T_E$. These delay times progressively decrease with increasing voltage; the delay time for a voltage greater that the $V_2$ voltage is zero.

During operation the information to be transmitted to the control unit 22 is whether the voltage of the grid is dropping or rising (to select the voltage band series to be used) and the actual voltage of the grid or a voltage indicative thereof (to select the particular voltage band and thus the delay time).

In different embodiments of the invention, the voltage drop band series and the voltage rise band series can be equal to or different from one another and the delay time associated thereto may also be equal to or different from one another.

The operation of the static exciter in this embodiment of the invention is substantially the same as that already described with reference to the first embodiment.

In particular, with reference to FIG. 3, when a disturbance occurs at the grid 20 the voltage at the grid 20 (and busbar 3) drops.

In this respect, for example the voltage drops in two steps from the voltage 30 (100%) to a voltage 31 greater than the voltage $V_1$.

The control unit 22 detects the voltage of the busbar 3 (that is indicative of the voltage of the grid 20) and ascertains that it is comprised in the voltage drop band A.

As a delay time $T_A$ corresponds to the voltage drop band A, the control unit 22 closes the switch 11 with a delay time $T_A$ (from when the voltage enters the voltage drop band A).

If before the closing of the switch 11 the voltage drops further, the control unit 22 detects the voltage of the busbar 3 (that is indicative of the voltage of the grid 20) and ascertains the new voltage drop band or is it is below the voltage $V_1$, therefore the switch 11 is closed accordingly.

For example, in FIG. 3 as soon as the voltage drops below the $V_1$ voltage, the control unit 22 closes the switch 11 (the delay time is zero).

Correspondingly, the voltage of the busbar 3 rises (because of the automatic protection device of the grid 20) in two or more steps.

Thus the control unit 22 detects the actual voltage of the busbar 3, ascertaining the voltage rise band to which it pertains.

For example the voltage of the busbar 3 rises up to a level corresponding to the D voltage band.

As to the D voltage band corresponds a delay time $T_D$, the control unit 22 only opens the switch 11 after a delay time $T_D$ (after the voltage enters the voltage rise band D).

Then, if the voltage rises further before the switch is opened, the control unit 22 detects the new voltage and drives the switch according to the delay time associated to it.

In FIG. 4 as soon as the voltage exceeds the $V_2$ voltage, the switch 11 is closed (the delay time is zero).

The present invention also refers to a method for operating a static exciter of a field winding of an electric generator.

The method consists in closing the switch 11, connecting the capacitor bank 10 in series with the rectifier 5, when the voltage of the grid 20 and thus of the busbar 3 drops below a first prefixed voltage value $V_1$, and opening the switch 11 again when the voltage of the grid 20 (and thus of the busbar 3) exceeds a second prefixed voltage value $V_2$, with the second prefixed voltage value $V_2$ greater than or equal to the first prefixed voltage value $V_1$.

Moreover, opening the switch 11 also occurs when the voltage of the capacitor bank 10 drops below a third prefixed voltage value $V_3$.

In a different embodiment of the method, the switch 11 is closed or opened with a prefixed delay.

In particular the control unit 22 has a plurality of voltage drop bands each associated with a prefixed closing delay time, and a delay time being zero for a voltage lower than the $V_1$ voltage.

Correspondingly, the control unit 22 has a plurality of voltage rise bands each associated with a prefixed opening delay time, and a delay time being zero for a voltage greater than the $V_2$ voltage.

When the grid voltage (and thus the voltage of the busbar 3) drops, an actual voltage indicative of the actual grid voltage is measured to ascertain the voltage drop band to which the grid voltage pertains; for example the voltage at the lower voltage side of the voltage transformer 7 is measured.

Then the switch 11 is closed with the delay time corresponding to the particular voltage drop band after the entrance of the voltage in the particular voltage drop band. If the voltage is lower than $V_1$ the delay time is zero.

Correspondingly, when the grid voltage (and thus the voltage of the busbar 3) rises, an actual voltage indicative of the grid voltage is measured to ascertain the voltage rise band to which the grid voltage pertains; for example the voltage at the lower voltage side of the voltage transformer 7 is measured.

Then the switch 11 is opened with the delay time corresponding to the particular voltage drop band after the entrance of the voltage in the particular voltage rise band. If the voltage is greater than $V_2$ the delay time is zero.

Naturally the features described may also be independently provided from one another.

The static exciter and the method conceived in this manner are susceptible to numerous modifications and variants, all falling within the scope of the inventive concept; moreover all details can be replaced by technically equivalent elements.

In practice the materials used and the dimensions can be chosen at will according to requirements and to the state of the art.

REFERENCE NUMBERS 1 static exciter
2 exciter transformer
3 busbar
4 generator
5 rectifier
6 AVR (Automatic Voltage Regulator)
7 voltage transformer
8 field winding of the generator
9 diode
10 capacitor bank
11 switch
12 charging device
20 grid
21 transformer
22 control unit
30 voltage
31 voltage
32 charging switch
$V_1$ first prefixed voltage value
$V_2$ second prefixed voltage value
$V_3$ third prefixed voltage value
A-E voltage bands
$T_A$-$T_E$ delay time corresponding to the voltage bands A-E

What is claimed is:

1. A static exciter of a field winding of an electric generator comprising:

a rectifier connected to an electric grid and to the field winding;
a unidirectional electronic switch connected in series with the rectifier;
a capacitor bank;
a further switch disposed electrically between the unidirectional electronic switch and the capacitor bank;
a control unit connected to the further switch and configured to close the further switch when a voltage indicative of a grid voltage drops below a first prefixed voltage value so as to connect the capacitor bank to the field winding so as to supply energy to the field winding from the capacitor bank and configured to interrupt current flowing between the capacitor bank and the field winding by opening the further switch when the voltage indicative of the grid voltage exceeds a second prefixed voltage value so as to disconnect the capacitor bank from the field winding, such that the capacitor bank supplies energy to the field winding only for the time needed,
wherein the control unit is configured to open or control the further switch with a prefixed delay, and
wherein the control unit includes at least one voltage drop band associated with a prefixed closing delay time for the further switch, wherein the closing delay time is zero for a voltage lower than the first prefixed voltage value, and wherein the control unit includes at least one voltage rise band associated with a prefixed opening delay time for the further switch, wherein the opening delay time is zero for a voltage greater than the second prefixed voltage value.

2. The static exciter as recited in claim 1, wherein the unidirectional electronic switch includes a forward biased diode.

3. The static exciter as recited in claim 1, wherein the second prefixed voltage value is greater than or equal to the first prefixed voltage value.

4. The static exciter as recited in claim 2, wherein the diode is connected in parallel with the capacitor bank.

5. The static exciter as recited in claim 1, further comprising a voltage transformer having a low voltage side and configured to feed an automatic voltage regulator of the field winding, wherein a grid voltage drop is measurable at the low voltage side.

6. The static exciter as recited in claim 1, wherein the rectifier includes a thyristor bridge.

7. The static exciter as recited in claim 1, wherein the control unit is configured to open the further switch when a voltage of the capacitor bank drops below a third prefixed voltage value.

8. A method for operating a static exciter of a field winding of an electric generator, wherein the static exciter includes a rectifier connected to an electric grid and to the field winding, a unidirectional electronic switch connected in series with the rectifier, a capacitor bank, a further switch disposed between the unidirectional electronic switch and the capacitor bank, and a control unit, the method comprising:

connecting the capacitor bank to the field winding by closing the further switch when a grid voltage drops below a first prefixed voltage value; and
interrupting current flowing from the capacitor bank to the field winding by opening the further switch when the grid voltage exceeds a prefixed voltage value such that the capacitor bank supplies energy to the field winding only for the time needed,
wherein the opening and the closing of the further switch is performed with a prefixed delay, wherein the control unit includes a plurality of voltage drop bands each associated with a prefixed closing delay time for the further switch, wherein the closing delay time is zero for a voltage lower than the first prefixed voltage value, and wherein the control unit includes a plurality of voltage rise bands each associated with a prefixed opening delay time for the further switch, wherein the opening delay time is zero for a voltage greater than the second prefixed voltage value, and further comprising:

measuring an actual voltage indicative of the grid voltage to determine to which of the plurality of voltage drop bands the grid voltage corresponds when the grid voltage drops, wherein the closing the further switch is performed according to the prefixed closing delay time after the actual voltage enters the voltage drop band; and measuring the actual voltage indicative of the grid voltage to determine to which of the plurality of voltage rise bands the grid voltage corresponds when the grid voltage rises, wherein the opening the further switch is performed according to the prefixed opening delay time after the actual voltage enters the voltage rise band.

9. The method as recited in claim 8, wherein the unidirectional electronic switch includes a forward biased diode.

10. The method as recited in claim 8, wherein the second prefixed voltage value is greater than or equal to the first prefixed voltage value.

11. The method as recited in claim 8, further comprising opening the further switch when a voltage of the capacitor bank drops below a third prefixed voltage value.

* * * * *